United States Patent [19]

SanGregory et al.

[11] Patent Number: 5,614,975
[45] Date of Patent: Mar. 25, 1997

[54] FILM BRAKE APPLIED BY EXPOSURE INITIATION

[75] Inventors: Jude A. SanGregory; Jeffrey A. Solomon, both of Spencerport, N.Y.; Albert E. Rieger, Unterboehringen, Germany

[73] Assignee: Eastman Kodak Company, Rochester, N.Y.

[21] Appl. No.: 590,247

[22] Filed: Jan. 23, 1996

Related U.S. Application Data

[63] Continuation of Ser. No. 333,818, Nov. 3, 1994, abandoned.

[51] Int. Cl.⁶ .................................................... G03B 17/42
[52] U.S. Cl. ............................................................ 396/396
[58] Field of Search ................................... 354/203, 206, 354/212, 213

[56] References Cited

U.S. PATENT DOCUMENTS

| | | |
|---|---|---|
| 1,829,332 | 10/1931 | Beck . |
| 3,595,151 | 7/1971 | Maas ............................................. 95/31 |
| 4,290,676 | 9/1981 | Hozman et al. . |
| 5,235,366 | 8/1993 | Kucmerowski .......................... 396/411 |

Primary Examiner—David M. Gray
Attorney, Agent, or Firm—Norman Rushefsky

[57] ABSTRACT

A photographic camera, including a moveable exposure initiation member, is provided with a film brake that is applied by movement of the member to initiate an exposure. The brake engages an element of the film advancing mechanism and thereby arrests film movement during the exposure. The brake is released after the exposure when the member returns to its original position.

A method of assembling a camera also is provided using certain parts reassembled and reused from a single-use camera with a film brake as noted above.

23 Claims, 5 Drawing Sheets

FILM BRAKE APPLIED BY EXPOSURE INITIATION

This is a Continuation of application Ser. No. 08/333,818, filed Nov. 3, 1994, now abandoned.

BACKGROUND OF THE INVENTION

Field of Invention

The invention relates to the field of photography, and more specifically to mechanisms and methods for reducing picture blur by curtailing movement of film relative to the camera during an exposure sequence. The invention also relates to a method of assembling a camera including features for reducing picture blur.

Description of the Prior Art

The invention is applicable to many camera designs, but has particular utility in low cost and single use cameras according to the preferred embodiment of the invention.

Single use cameras are assembled from relatively inexpensive components and sold with the film included. During manufacture, a film cartridge, typically in a standard 35 mm size and format, is positioned in a camera take-up chamber. Most of the film is then pulled from the cartridge, positioned across an exposure plane and prewound into a film supply chamber opposite the exposure plane from the take-up chamber. In use, camera mechanisms advance the film sequentially, one frame for each picture, from the supply chamber across the exposure plane and back into the cartridge. The advancing mechanism typically is a thumb wheel that engages a spool inside the cartridge and rotates the spool to draw the film, attached to the spool, from the supply chamber into the cartridge.

Although simple in construction, single use cameras include suitable mechanisms for metering the film to position the individual frames properly in the exposure position. Perforations along an edge of the film engage and drive a sprocket wheel when the film is advanced. The sprocket wheel includes a notched cam that rotates with the sprocket, one revolution for each film frame. When a film frame is properly positioned for exposure, an arm on a film metering lever pivots into the notch. This same pivotal motion moves another arm on the same lever into engagement with teeth around the periphery of the thumb wheel and thereby prevents further advancement of the film. The film also is prevented from backing up toward the supply chamber. An anti-backup arm is biased to ratchet against the thumbwheel teeth, preventing rotation of the wheel in the reverse direction. The film is thus locked against forward movement by the metering lever and against backward movement by the anti-backup arm.

An exposure is initiated by depression of a trigger button that releases a latch constraining a high energy striker. The striker drives a shutter blade to open an exposure aperture and expose the film. The striker also pivots the metering lever from the cam notch, and releases the thumb wheel and film for advancement. When the sprocket is rotated again by engagement with the film perforations, the cam resets the high energy striker, latching it for the next exposure.

A single use camera of the type described above is disclosed, for example, in U.S. Pat. No. 5,235,366, issued Aug. 10, 1993.

PROBLEM SOLVED BY THE INVENTION

The above-described mechanisms provide many advantages in low cost cameras. At the same time, however, problems remain that will become apparent from this description. Energy is stored in the anti-backup mechanism that is released when the metering lever is retracted from the cam notch. The anti-backup arm then may settle between the ratchet teeth on the thumb wheel, moving the wheel and the film. Since this occurs during the exposure sequence, the exposed image may be blurred by film movement.

The problem can be aggravated by a number of factors. Some camera operators wind the thumb wheel tightly, storing more energy in the anti-backup mechanism. Loose tolerances, typical of inexpensive cameras, and the relative positions of the mechanisms are other contributors. Substantial spring energy may be loaded between the anti-backup and metering mechanisms as they bias the film in opposite directions. This energy is released while the shutter is open and the high energy lever pivots the metering lever free from the cam notch.

SUMMARY OF THE INVENTION

The present invention is directed to overcoming one or more of the problems set forth above. Briefly summarized, according to one aspect of the invention, a photographic camera, including a moveable exposure initiation member, is provided with a film brake that is applied by movement of the member to initiate an exposure. The brake engages an element of the film advancing mechanism and thereby arrests film movement during the exposure. The brake is released after the exposure when the member returns to its original position.

According to more specific features, the camera is enclosed in a casing, the exposure initiation member includes a depressible button accessible from outside the casing, and depression of the button moves an abutment into engagement with a thumb wheel that is part of the film advancing mechanism. The exposure initiation member is biased against depression, and the bias removes the abutment from engagement with the film advancing mechanism when said button is released. Still more specifically, the rotatable thumb wheel is captured between the exposure initiation member and an opposed stationary camera element opposite the wheel from the member. The thumb wheel is retained against movement when the camera's metering mechanism is released, and then is freed from its restriction, after the exposure, when the exposure initiating member is released. Particularly advantageous features of the invention employ an exposure initiation member that is a lever pivoted at one end. The exposure sequence is initiated by releasing a latch at the opposite end of the lever from the pivot, where movement of the lever is greatest, while the brake is applied at a point relatively close to the pivot, where the force is increased by the lever arm.

The invention includes a method of assembling a camera to provide the features and advantages noted above, and particularly by assembling the camera from certain parts reassembled and reused from a single-use camera.

The invention arrests film movement during the exposure sequence without increasing undesirable frictional forces when the film is advanced between exposures. Implementation of the invention is relatively simple, and provides a solution with no significant incremental cost of manufacture.

These and other features and advantages of the invention will be more clearly understood and appreciated from a review of the following detailed description of the preferred embodiments and appended claims, and by reference to the accompanying drawings.

DESCRIPTION OF THE PREFERRED EMBODIMENTS

Figure 1:
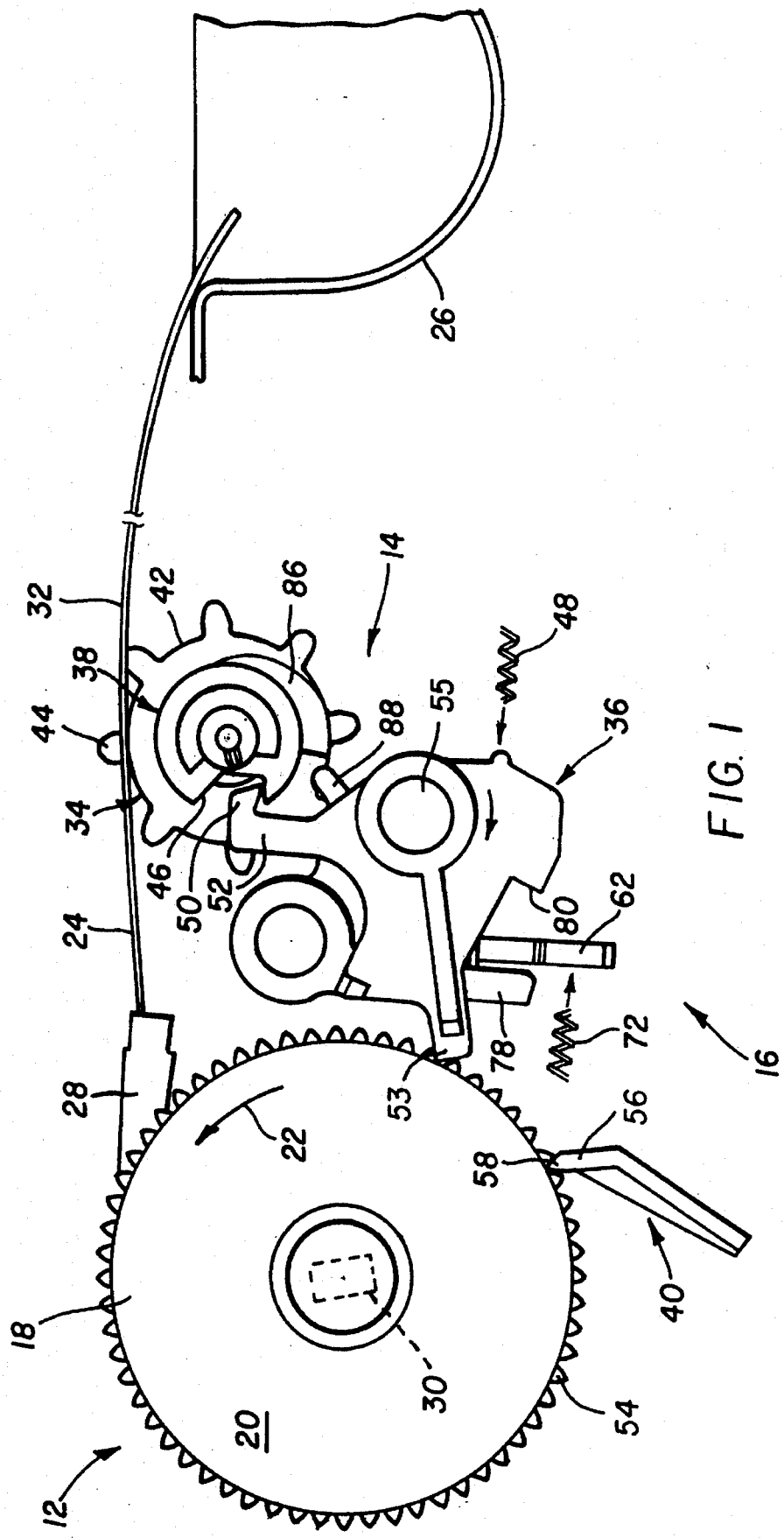
FIG. 1 is a top view of a camera with parts removed to show film advancing, metering and exposing mechanisms used with a preferred embodiment of the invention. The mechanisms are illustrated in a metered and energized condition prior to an exposure.

Referring now to the drawings, and beginning with FIG. 1, internal camera mechanisms are depicted including film advancing mechanism 12, metering mechanism 14, and exposure mechanism 16. The various mechanisms are enclosed within a camera casing 17 (FIG. 6), with various elements accessible from outside the casing as will be described.

The film advancing mechanism 12 includes a thumb wheel 18 mounted for rotation adjacent a top corner of the casing with a sector 20 extending beyond the casing where it is accessible to the camera operator. Rotation of the thumb wheel in a counterclockwise direction 22, as viewed in FIG. 1, advances film 24 sequentially from a supply chamber 26 into film cartridge 28. The film cartridge is a standard 35 mm format and is positioned by the camera manufacturer in a film take-up chamber under the thumb wheel 18. The cartridge includes a slotted spool, adapted to mate with a projection 30 on the thumb wheel, so rotation of the wheel turns the spool and draws the film from the supply chamber 26, across an exposure position 32 and into the cartridge 28. Further details of this mechanism are disclosed, for example, in U.S. Pat. No. 5,235,366, issued Aug. 10, 1993.

The film metering mechanism includes sprocket 34, metering lever 36 and cam 38. An anti-backup mechanism 40 works with the metering mechanism and will be described with it.

Sprocket 34 includes a hub 42 with projections 44 that engage and extend into perforations along an edge of the film 24. The perforations are arranged according to the standard 35 mm format, and the sprocket projections 44 are designed with a circumferencial spacing equal to the distance between the perforations. When the film advancing mechanism 12 moves the film from the supply chamber 26 toward the cartridge 28, engagement between the film perforations and sprocket projections 44 drives the sprocket in a counterclockwise direction as viewed in FIG. 1. One complete revolution of the sprocket corresponds to the pitch between adjacent film frames, or the distance the film moves between each sequential exposure. Although the term "film frame" is used in this specification in reference to an area that is exposed on the film, there is no visible frame on the unexposed film. The position of the frame is determined by the metering mechanism. Its area is a function of the camera structure that defines the edges of the image projected onto the film.

Cam 38 is secured to and rotates with the sprocket, one revolution for each film frame or exposure sequence. The cam is notched at 46 for purposes to be described next.

Metering lever 36 is mounted for pivotal movement and is biased clockwise by spring 48, so a hook 50, on an arm or follower portion 52, of the metering lever 36 engages and follows the surface of cam 38. When the notch 46 in cam 38 rotates into alignment with hook 50, the hook drops into the notch 46, rotating the lever clockwise. Clockwise rotation of the metering lever 36 moves an oppositely extending arm 53 into engagement with the thumb wheel 18 and prevents further movement of the film 24 toward cartridge 28. The wheel 18 includes serrations or teeth 54 around its outer peripheral edge. The center of rotation 55, of metering lever 36, is positioned so the square corner of arm 53 will engage the teeth like a ratchet, preventing rotation of the wheel in the film advancing direction. In this position of advancement, the film is properly positioned in the film plane for an exposure.

Anti-backup mechanism 40 is a resilient member 56 urged against the edge of thumb wheel 18 and its peripheral teeth 54. A pointed end 58 of the resilient member 56 engages the teeth 54 and acts like another ratchet. The ratcheting action of the anti-backup lever is opposite that of the metering arm. It permits rotation of the thumb wheel freely in the counterclockwise direction, but blocks clockwise rotation. The metering and anti-backup mechanisms thus work together to prevent movement of the film in either direction, once a respective film frame is properly metered into position at the exposure plane.

Exposure mechanism 16 includes an exposure initiation member 60 (FIGS. 2 and 3), a high energy lever 62, a shutter 64 and an exposure aperture 66.

The exposure initiation member is a resilient part coupled to the camera core and including a button 68 and latch 70, both on a flexible arm. The button is depressable against the resilient bias of the arm to move the abutment latch 70 from a latching position depicted in FIG. 2 to a releasing position depicted in FIG. 3.

Figure 2:
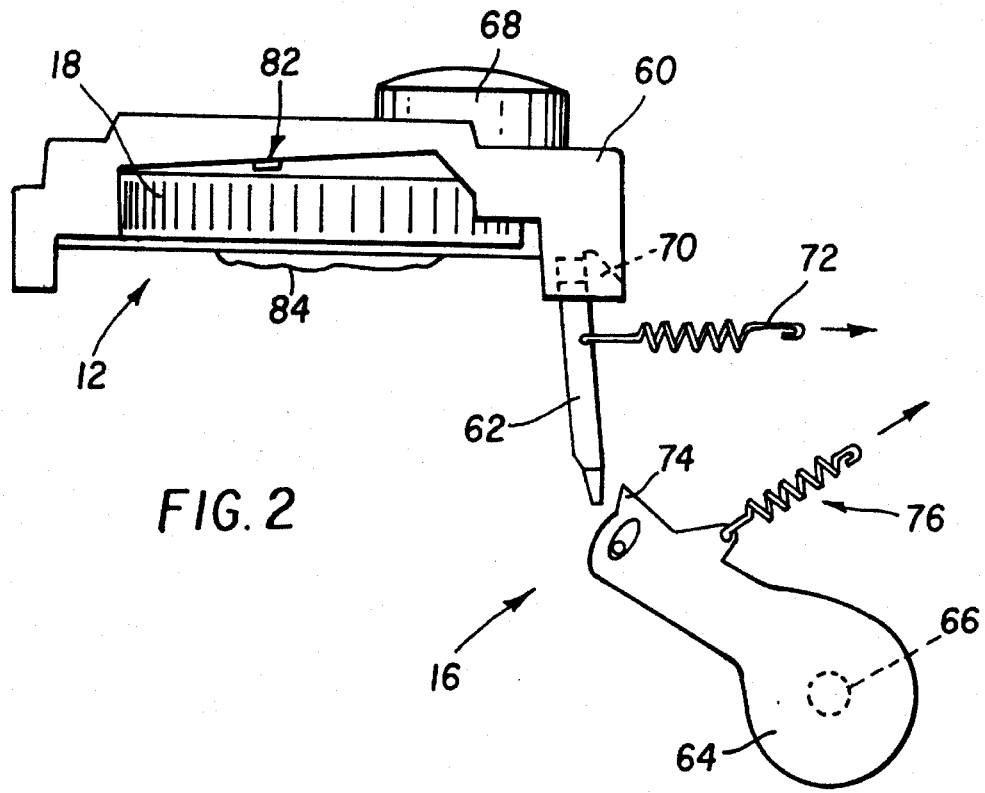
FIG. 2 is a is a front view of the camera of FIG. 1 with parts removed to illustrate a film brake according to a preferred embodiment of the invention. The break is depicted in a condition prior to exposure, corresponding to FIG. 1.
Figure 3:
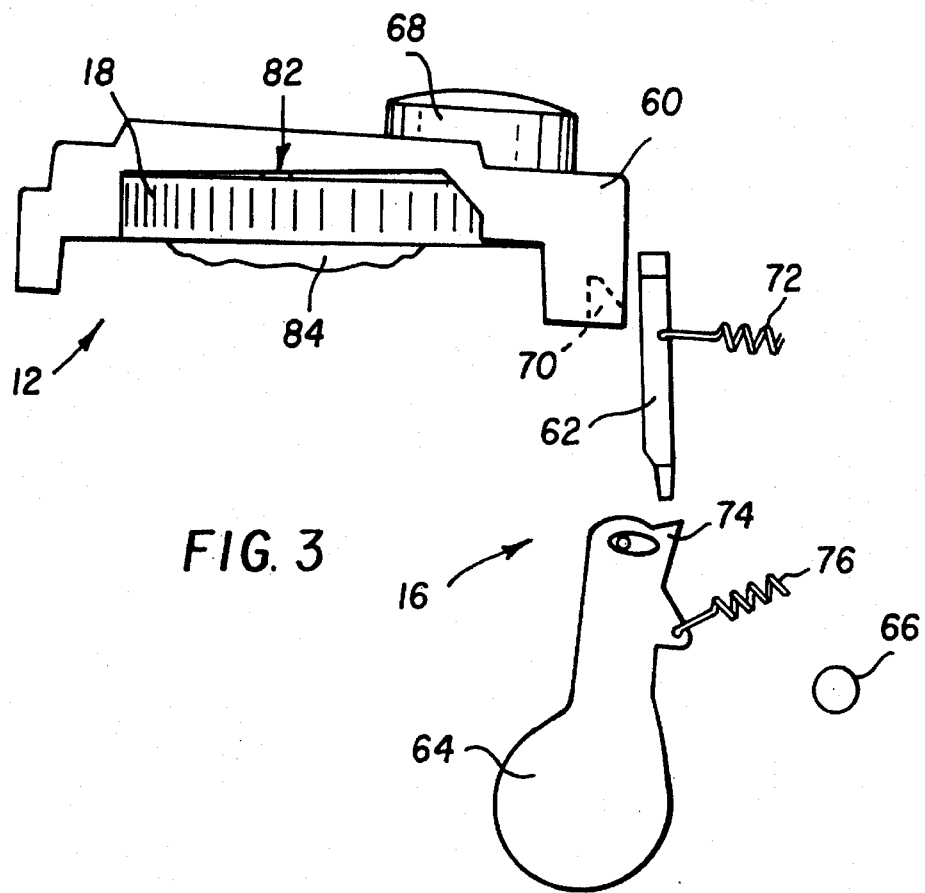
FIG. 3 is a front view of the film brake of FIG. 2 depicted in operation during an exposure sequence.
Figure 4:
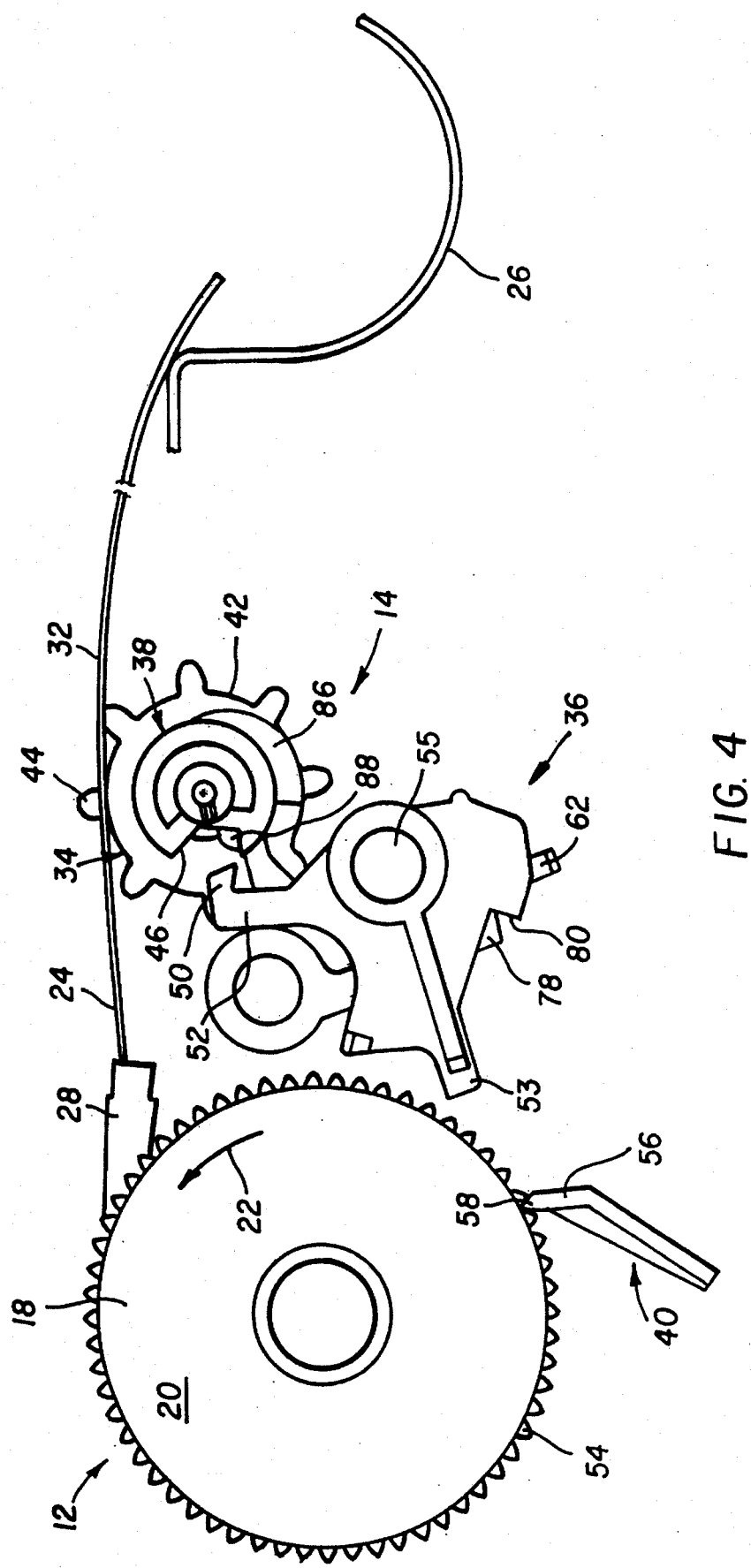
FIG. 4 is a top view corresponding to FIG. 3 with the mechanisms illustrated in a released condition after an exposure.

The high energy lever 62 is mounted to pivot about a vertical axis and is urged by a high energy spring 72 to rotate counterclockwise in FIGS. 1 and 4, which is to the right in FIGS. 2 and 3. The lever moves rapidly into striking engagement with a shutter abutment 74, driving the shutter clockwise and uncovering exposure aperture 66, exposing the film. The exposure cycle is completed when the shutter returns to its original position under the influence of spring 76.

The high energy lever continues to rotate counterclockwise until an abutment 78 (FIGS. 1 and 4), on the high energy lever strikes a notch 80 on the metering lever 36. This pivots the metering lever 36 counterclockwise (FIG. 4), disengages hook 50 on arm 52 from notch 46 in cam 38, and releases ratchet arm 53 from engagement with the thumb wheel 18. The metering mechanism is thus released and ready for metering film movement for the next successive exposure.

A brake pad or abutment 82 (FIGS. 2, 3, 5 and 6) is provided on the exposure initiation member 60 to prevent movement of the film during the exposure sequence when and immediately after the metering mechanism is released. The pad and its operation prevent film movement that might be caused by energy stored in the anti-backup mechanism 40. The brake pad 82 moves with the exposure initiation member 60 and into engagement with the top of thumb wheel 18. The thumb wheel is slightly loose in its mounting, and is captured between the brake pad 82 and a portion 84 of the camera structure opposite the thumb wheel from the brake pad. The thumb wheel is thus wedged against movement during the exposure sequence and the time period when hook 50 of metering mechanism 36 is released from notch 46 and arm 53 is disengaged from teeth 54 of thumb wheel 18. The exposure initiation member 60 is released after the exposure sequence, and brake pad 82 is removed from engagement with the thumb wheel by the resilient bias returning the member 60 to its original position depicted in FIG. 2. Thus the frictional forces from the brake pad are removed and do not resist operation of the film advancing mechanism to advance the film for the next exposure.

After the exposure, the film is advanced to position the next frame in the exposure position. Movement of the film again drives sprocket 34 and a second cam 86 secured to the sprocket coaxial with cam 38. The second cam engages an extension 88 (FIGS. 1 and 4) of the high energy lever and rotates the lever, returning it to its latched position behind latch 70.

Figure 5:
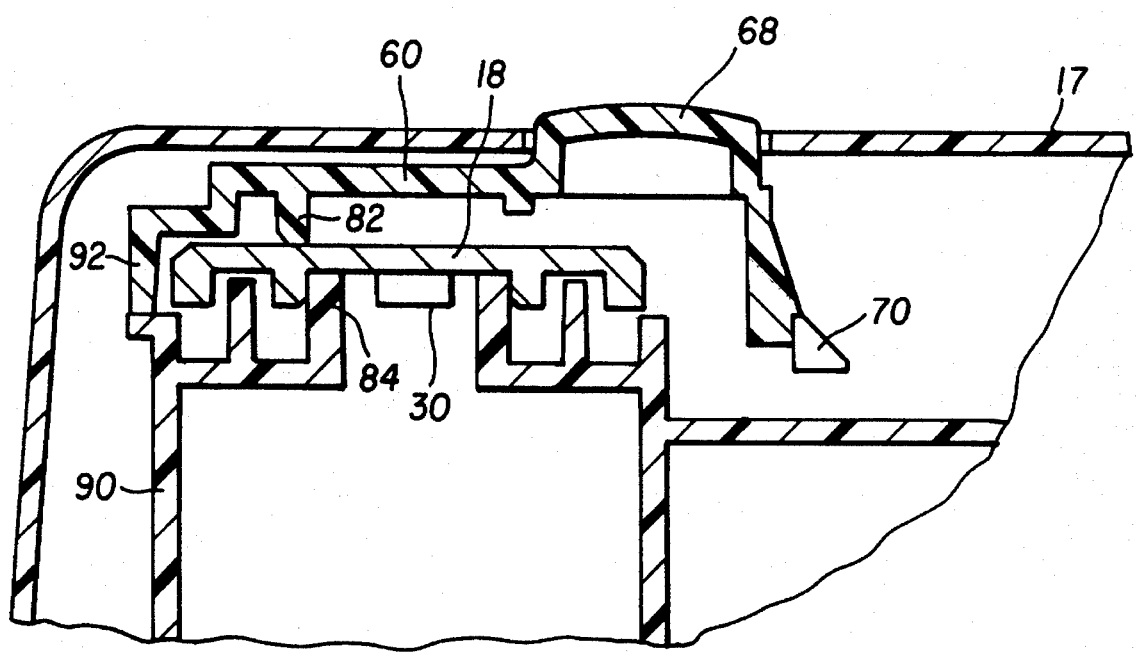
FIG. 5 is a cross sectional view corresponding to FIG. 2 but showing elements of the brake and corresponding parts in more detail, including their method of assembly.
Figure 6:
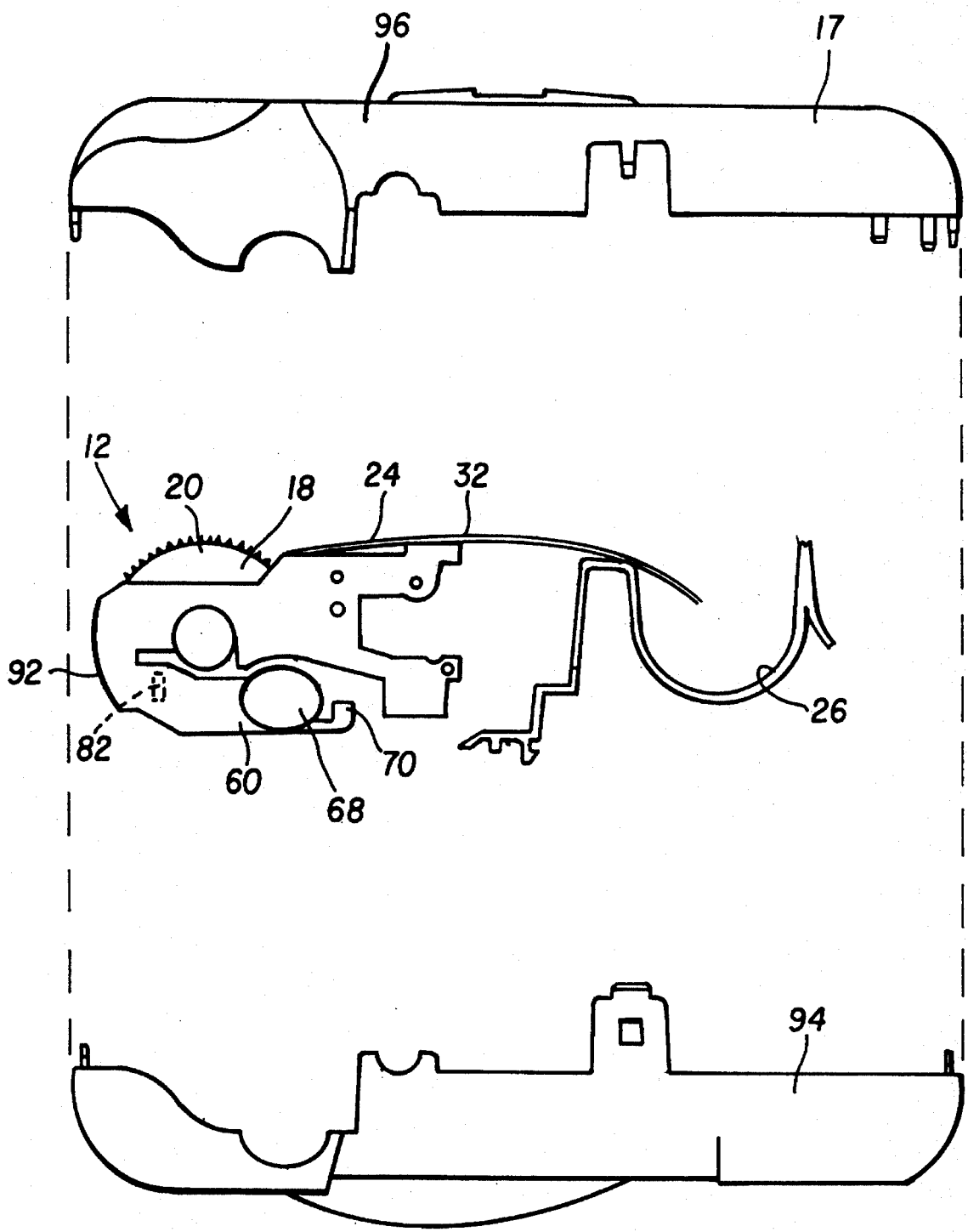
FIG. 6 is a simplified exploded view of the camera of FIGS. 1–5 depicting the relationship of certain parts and their method of assembly.

Certain details of the invention and its operation are depicted more clearly in FIGS. 5 and 6. The exposure actuation member 60 is a lever arm mounted on camera core 90 for pivotal movement at one end 92. The latch 70 is at the opposite end of the lever arm, providing the greatest amount of movement for releasing the high energy lever 62 from the latch. The brake 82 is closer to the pivot point 92, where the force is increased by the action of the lever arm. In addition, the camera portion 84 is an annular ring that is relatively narrow, and again concentrates the wedging or locking forces between the portion 84 and brake 82.

According to the method, the camera is assembled from parts of a previously used single-use camera. The core is reused, including the film supply and take-up chambers, the rotatable thumb wheel is assembled on top of the core adjacent the take-up chamber, and a film cartridge containing an unexposed film strip is loaded into the take-up chamber in driving engagement with the thumb wheel. At least a substantial portion of the film strip is prewound into the supply chamber. The moveable exposure initiation member is assembled on the core spaced from the thumb wheel and opposite the thumb wheel from the take-up chamber, where it is arranged and positioned to move into engagement with the thumb wheel when the member is moved to initiate an exposure. Front and back casing parts or covers 94 and 96 are then assembled over the core with the thumb wheel 18 and button 68 protruding and accessible to the camera operator.

While the invention is described in connection with a preferred embodiment, other modifications and applications will occur to those skilled in the art. The claims should be interpreted to fairly cover all such modifications and applications within the true spirit and scope of the invention.

PARTS LIST FOR FIGURES

Reference No. Part
12. Film advancing mechanism.
14. Film metering mechanism.
16. Exposure mechanism.
17. Camera casing.
18. Thumb wheel.
20. Sector of thumb wheel.
22. Counterclockwise direction.
24. Film.
26. Film supply chamber.
28. Film cartridge.
30. Projection.
32. Exposure position.
34. Metering sprocket.
36. Metering lever.
38. Metering cam.
40. Anti-backup mechanism.
42. Hub.
44. Projections.
46. Notch.
48. Spring.
50. Hook.
52. Follower.
53. Ratchet arm.
54. Teeth.
55. Center of rotation.
56. Resilient member.
58. Pointed end.
60. Exposure initiation member.
62. High energy lever.
64. Shutter.
66. Exposure aperture.
68. Button.
70. Latch.
72. High energy spring.
74. Shutter abutment.
76. Spring.
78. Abutment.
80. Notch.
82. Brake pad.
84. Portion of camera structure.
86. Second cam.
88. Extension of high energy lever.
90. Camera core.
92. Pivotal end.
94. Front cover.
96. Back cover.

What is claimed is:

1. A photographic camera comprising;.

a film exposing mechanism, and a film advancing mechanism, wherein the film exposing mechanism includes an exposure initiation member and the film exposing mechanism is operative to complete an exposure in response to movement of the exposure initiation member; and brake means responsive to movement of the exposure initiation member for applying a brake to the film advancing mechanism to brake said film advancing mechanism and thereby a film in the camera against movement during the exposure.

2. The camera of claim 1, including a casing for establishing an enclosure for said camera, said exposure initiation member including a depressible button accessible from outside the casing, and said brake means including an abutment moveable in response to depression of said button into engagement with the film advancing mechanism.

3. The camera of claim 2, including means for establishing a bias for biasing said button against depression, and said bias removing said abutment from engagement with the film advancing mechanism when said button is released.

4. The camera of claim 3, wherein said film advancing mechanism includes a thumb wheel, and said engagement is between said abutment and said wheel.

5. The camera of claim 4, wherein said depression of said button captures said wheel between said abutment and an opposed camera element opposite said wheel from said abutment.

6. A photographic camera comprising:
   a film exposing mechanism;
   a film advancing mechanism for sequentially positioning successive frames of a film at an exposure position;
   a film metering mechanism for resisting movement of one of the successive frames beyond the exposure position;
   a movable exposure initiation member for actuating said exposing mechanism to expose the film and releasing said metering mechanism to permit advancing of the next successive frame to the exposure position; and
   brake means responsive to movement of the exposure initiation member for applying a brake to the film advancing mechanism when the metering mechanism is released to arrest film movement otherwise permitted by said release.

7. The camera of claim 6, including a resilient anti-backup element engaging the film advancing mechanism to prevent film back-up from the exposure position, said brake means arresting film movement caused by the resiliency of said anti-backup element when the metering mechanism is released.

8. The camera of claim 7, and a casing establishing an enclosure for said camera, said exposure initiation member is a depressible button accessible from outside the casing, and in response to depression of said button, said button moves an abutment into engagement with the film advancing mechanism.

9. The camera of claim 8, wherein said button is on a lever arm pivoted at one end, and said abutment is between said button and said pivot.

10. The camera of claim 9, wherein said film advancing mechanism includes a rotatable disk, and said engagement is between said abutment and said disk.

11. The camera of claim 10, and including a camera element located opposite said disk from said abutment and wherein said depression of said button captures said disk between said abutment and the camera element.

12. A photographic camera for exposing successive frames on a film strip at an exposure position; said camera comprising:
   a film exposing mechanism including a shutter;
   a film advancing mechanism including a disk rotatable sequentially to move the successive frames into the exposure position;
   a film metering mechanism, said metering mechanism including a rotatable element rotatable by the film movement and a lever cooperating with said rotatable element sequentially to arrest movement of the successive frames beyond the exposure position;
   an exposure initiation member moveable to actuate said shutter to expose a film frame in the exposure position and to release said metering mechanism to permit movement of the next successive frame to the exposure position; and
   a brake moveable with said member to engage said disk to prevent movement of said disk during the exposure.

13. The camera of claim 12, wherein said exposure initiation member is operative to release said metering mechanism while said brake engages said disk.

14. A method of assembling a photographic camera with a film cartridge including a film strip; said method comprising:
   providing a core structure including a film supply chamber and a take-up chamber;
   assembling a thumb wheel adjacent the take-up chamber rotatable for rewinding the film strip from the supply chamber into the take-up chamber;
   loading the film cartridge into the take-up chamber in engagement with said thumb wheel and prewinding the film strip from the cartridge into the supply chamber;
   assembling a moveable exposure initiation member that includes a brake spaced from said thumb wheel opposite said thumb wheel from the take-up chamber, said member being movable to move said brake into engagement with said thumb wheel when said member is moved to initiate an exposure.

15. The method of claim 14, wherein said camera includes a film metering mechanism, and said method includes the step of defeating said mechanism during prewinding of the film from the cartridge to the supply chamber.

16. A method of making a single-use camera from previously used camera parts, said method comprising:
   obtaining a camera core including a film supply chamber and a take-up chamber from a previously used camera;
   assembling a rotatable thumb wheel on said core adjacent said take-up chamber;
   loading a film cartridge containing an unexposed film strip into the take-up chamber in engagement with said thumb wheel, and prewinding at least a substantial portion of the film strip into the supply chamber;
   assembling a moveable exposure initiation member on said core spaced from said thumb wheel opposite said thumb wheel from said take-up chamber, and positioning said member on said core so that said member is movable into engagement with said thumb wheel when said member is moved to initiate an exposure.

17. The method of claim 16, wherein said camera includes an anti-backup mechanism engaging said thumb wheel, and said method includes the step of defeating said mechanism during prewinding of the film from the cartridge to the supply chamber.

18. A photographic camera comprising:
   a camera core including a film supply chamber and a film take-up chamber;
   a film metering mechanism including a toothed thumb wheel mounted for rotation, a toothed sprocket for engaging perforations in a segment of a film strip locatable between the supply chamber and the take-up chamber, a metering lever including means for engaging toothed projections on the thumb wheel and means coupled with the sprocket to block rotation of the thumb wheel in a film advancing direction when an image frame of the film strip is positioned in a location for exposure, anti-backup means for blocking rotation of the thumb wheel in a direction opposite of that for film advance;
   an exposure mechanism including a shutter mechanism and an exposure initiation member, the exposure initiation member including a first means responsive to movement of the exposure initiation member for actuating the shutter mechanism to commence an exposure and a second means for releasing the metering lever from engagement with the thumb wheel; and
   means responsive to movement of said exposure initiation member for engaging said thumb wheel during an exposure to brake the thumb wheel and block rotation of the thumb wheel to reduce movement of the film strip during exposure.

19. The camera of claim 18 and wherein the core includes means for supporting the thumb wheel for rotation on the core above the film take-up chamber and the thumb wheel is located between a structure on the exposure initiation member and the core, and upon movement of the exposure initiation member to initiate an exposure the thumb wheel is pinched by the structure on the exposure initiation member and the core and thereby blocked from rotation during exposure.

20. The camera of claim 18 and wherein the structure on the exposure initiation member includes a depending appendage that extends downwardly from the exposure initiation member towards the thumb wheel and engages the thumb wheel during the exposure.

21. The camera of claim 18 in combination with a film cartridge that is located in the film take-up chamber and a film strip extends between said film supply chamber and said film take-up chamber.

22. A method of operating a photographic camera comprising;

sequentially positioning successive frames of a film at an exposure position by operating a film advancing mechanism that is accessible for manual movement by a camera operator;

operating, for each film frame, a film metering mechanism for resisting movement of the film frame beyond the exposure position;

operating, for each film frame, a manually movable exposure initiation member to actuate an exposure mechanism to expose the film frame and to release said metering mechanism from resisting movement of the film frame to permit advancing of a next successive frame to the exposure position; and applying a brake to the film advancing mechanism, which brake is maintained through application of a force by the camera operator on the exposure initiation member when the metering mechanism is released to arrest film movement otherwise permitted by said release.

23. The method of claim 22, and engaging the film advancing mechanism with a resilient anti-backup element to prevent film back-up, and said brake arrests film movement caused by the resiliency of said anti-backup element when the film metering mechanism is released.

* * * * *